Aug. 18, 1931.  W. C. STEVENS  1,819,990
TESTING MACHINE
Filed Jan. 18, 1927
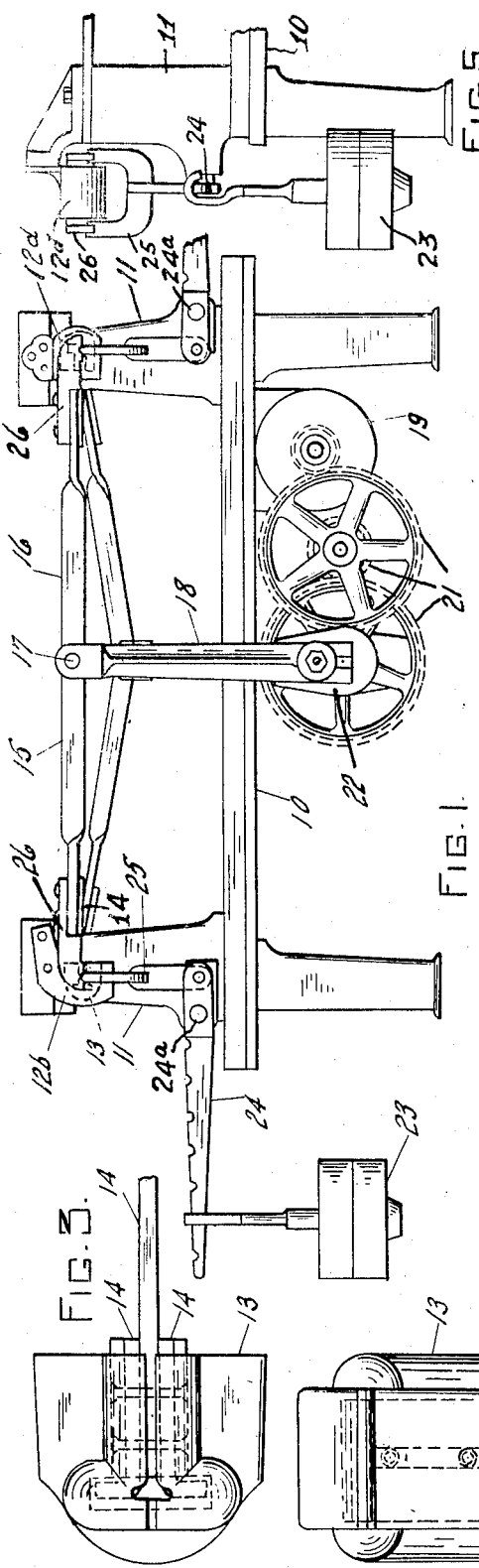
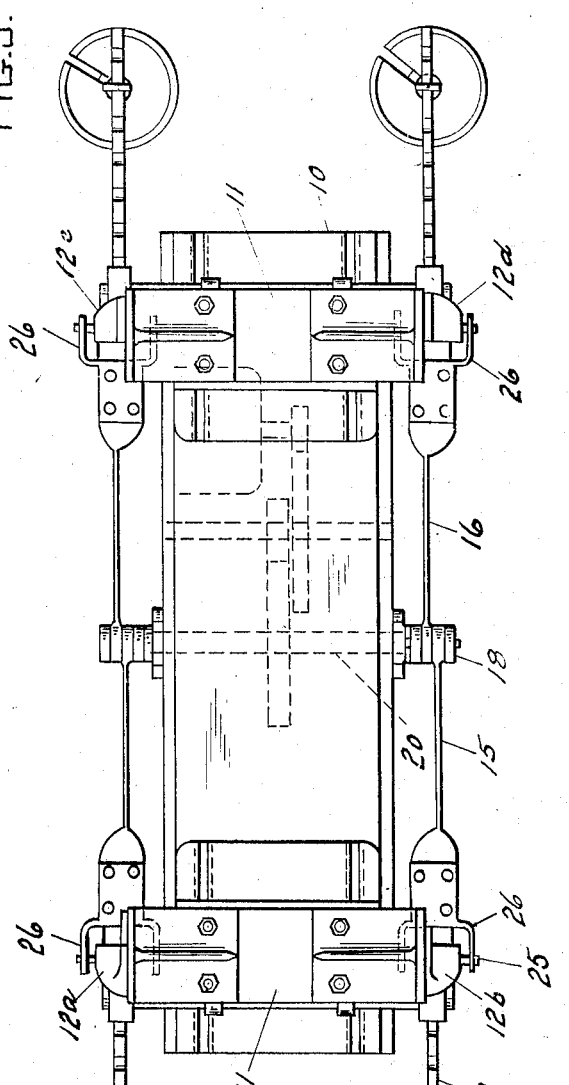
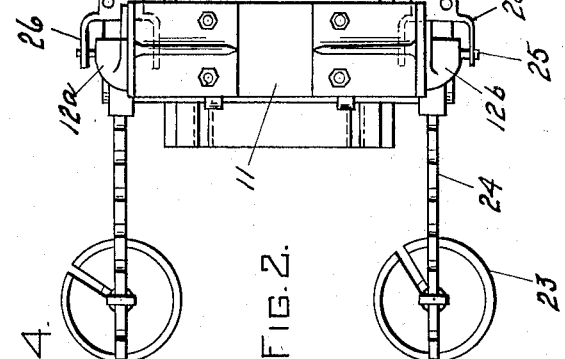
INVENTOR.
WILLIAM C. STEVENS.
BY  Ely & Barrow
ATTORNEY.

Patented Aug. 18, 1931

1,819,990

UNITED STATES PATENT OFFICE

WILLIAM C. STEVENS, OF AKRON, OHIO, ASSIGNOR TO THE FIRESTONE TIRE AND RUBBER COMPANY, OF AKRON, OHIO, A CORPORATION OF OHIO

TESTING MACHINE

Application filed January 18, 1927. Serial No. 161,780.

This invention relates to testing machines for testing rubber shock insulators, such as used on automobile springs in place of shackle bolts.

An attempt has heretofore been made to devise a factory test for these insulators, but has met with failure since constant flexing of the automobile leaf spring used in the test causes crystallization and fracture of the spring after only five or six hours running time.

It is an object, therefore, of this invention to provide a means for simulating the reciprocating and extending action of a leaf spring for testing shock insulators, and at the same time avoiding the crystallization heretofore encountered. A further object is to provide means for applying to the insulator being tested, a load equivalent of the weight of an automobile.

The foregoing and other objects are obtained by the device illustrated in the accompanying drawings and described below. It is to be understood that the device is not limited to the specific form thereof disclosed herein.

Of the accompanying drawings:

Figure 1 is a front elevation of a machine embodying the principles of the invention;

Figure 2 is a plan thereof;

Figure 3 is an elevational detail of a portion of the device;

Figure 4 is a plan detail thereof; and

Figure 5 is a detail end view of the device.

Referring more particularly to the drawings, 10 represents a frame having adjustably mounted on the ends thereof upright posts or supports 11, 11 adapted to be positioned at a greater or lesser distance apart. Shock insulator housings $12^a$, $12^b$, $12^c$, and $12^d$ are attached to the respective sides of the two supports, the two housings on each side being similar to the front and rear insulator housings for a spring on an automobile. A rubber shock insulator 13 to be tested is placed in each housing and each has positioned therein leaf spring ends 14. The body of the spring, however, is cut off and bars 15 and 16 substituted. Spring ends 14 are riveted to the outer ends of the bars and the inner ends of the latter are hinged together over shaft 17 attached to a pitman 18. It will be seen that vertical reciprocation of shaft 17 will produce at spring ends 14 a motion identical to that produced in a reciprocating automobile spring. The spring end 14 in each insulator will have an up and down angular movement and on one end will also have an in and out reciprocating movement. Motive power for the device is furnished by a motor 19 attached to frame 10 and geared to a shaft 20 through suitable reducing gears 21. Each end of shaft 20 is provided with a crank 22 to which is pivoted pitman 18, the connection being adjustable radially of shaft 20 to permit variations of amplitude in the reciprocation of bars 15 and 16.

To simulate the weight of an automobile on the insulators, a force is applied to each of the spring ends 14 by weight 23 acting on lever 24 pivoted at $24^a$ and transmitting the force through a yoke-shaped push rod 25 to bracket 26 riveted to said spring ends, the force being directed upwardly, just the reverse of the direction of force in the automobile.

The operation has been set forth with the description above and need not be further detailed. Modifications of the invention may be resorted to without departing from the spirit thereof or the scope of the appended claims.

What is claimed is:

1. A machine for testing rubber shock insulators, comprising a pair of spaced fixed housings for said insulators, spring ends adapted to be reciprocated within said insulators, a pair of rigid bars having one end of each hinged together, said bars being attached at their other ends to said spring ends, means for vertically reciprocating said hinged ends, and means for applying to said spring ends a load equivalent to the weight of an automobile.

2. A machine for testing rubber shock insulators, comprising a pair of spaced fixed housings for said insulators, spring ends adapted to be reciprocated within said insulators, a pair of rigid bars having one end of each hinged together, said bars being attached at their other ends to said spring ends, and means for vertically reciprocating said hinged ends.

3. A machine for testing rubber shock insulators, comprising a pair of spaced fixed housings for said insulators, hinged rigid means simulating the action of an automobile spring when reciprocated, said means adapted to be supported in said insulators, and mechanism for reciprocating said hinged means.

4. A testing machine comprising means for housing the article to be tested, non-flexing means simulating the action of an automobile spring when reciprocated, said means having a portion thereof adapted to be reciprocably supported in said article, mechanism for reciprocating said last-named means, and means for exerting on said article a force equivalent to the weight of an automobile.

5. A testing machine comprising means for housing the article to be tested, non-flexing means simulating the action of an automobile spring when reciprocated, said means having a portion thereof adapted to be reciprocably supported in said article, and mechanism for reciprocating said last-named means.

6. A testing machine for a rubber shock insulator comprising means for housing a rubber shock insulator, means adapted to be supported in said insulator for simulating the action of a corresponding part of an automobile, and means for moving said last-named means in simulation of the movement of the corresponding part in an automobile.

WILLIAM C. STEVENS.